US007555701B2

(12) United States Patent
Subbarao (10) Patent No.: US 7,555,701 B2
(45) Date of Patent: Jun. 30, 2009

(54) METHOD AND SYSTEM FOR RECOVERING FROM MULTIPLE DRIVE FAILURES

(75) Inventor: Sanjay Subbarao, Irvine, CA (US)

(73) Assignee: Adaptec, Inc., Milpitas, CA (US)

( * ) Notice: Subject to any disclaimer, the term of this patent is extended or adjusted under 35 U.S.C. 154(b) by 556 days.

(21) Appl. No.: 11/266,341

(22) Filed: Nov. 4, 2005

(65) Prior Publication Data

US 2006/0129760 A1  Jun. 15, 2006

Related U.S. Application Data

(60) Provisional application No. 60/624,564, filed on Nov. 4, 2004.

(51) Int. Cl.
*H03M 13/00* (2006.01)
(52) U.S. Cl. .................................... 714/781
(58) Field of Classification Search ............... 714/781
See application file for complete search history.

(56) References Cited

U.S. PATENT DOCUMENTS

| 4,763,332 | A | * | 8/1988 | Glover ..................... 714/756 |
| 4,782,490 | A | * | 11/1988 | Tenengolts ................ 714/756 |
| 5,274,645 | A | * | 12/1993 | Idleman et al. ................ 714/6 |
| 5,285,451 | A | * | 2/1994 | Henson et al. ................ 714/6 |
| 5,333,143 | A | * | 7/1994 | Blaum et al. ............... 714/766 |
| 5,513,192 | A | | 4/1996 | Janku et al. |
| 6,138,125 | A | * | 10/2000 | DeMoss ..................... 707/202 |
| 6,353,895 | B1 | * | 3/2002 | Stephenson .................... 714/5 |
| 6,557,123 | B1 | | 4/2003 | Wiencko, Jr. et al. |
| 6,567,891 | B2 | * | 5/2003 | Oldfield et al. ............. 711/114 |
| 6,694,479 | B1 | * | 2/2004 | Murthy et al. .............. 714/805 |
| 7,111,227 | B2 | * | 9/2006 | Oldfield et al. ............. 714/801 |
| 7,188,270 | B1 | * | 3/2007 | Nanda et al. .................... 714/6 |
| 7,219,289 | B2 | * | 5/2007 | Dickson .................... 714/752 |
| 7,412,563 | B2 | * | 8/2008 | Subbarao et al. ........... 711/114 |
| 2005/0273651 | A1 | | 12/2005 | Subbarao |

FOREIGN PATENT DOCUMENTS

WO  WO 01/10043  2/2001

OTHER PUBLICATIONS

Subbarao, U.S. Appl. No. 11/196,409, filed Aug. 4, 2005.

* cited by examiner

*Primary Examiner*—Joseph D Torres
(74) *Attorney, Agent, or Firm*—Dickstein Shapiro LLP (57) ABSTRACT

A method of calculating parity for an m-storage element failure in a networked array of storage elements. A first set of n XOR relationships is derived, each first set relationship containing n data symbols from n storage elements and one parity symbol from a first set of parity symbols. A second set of n XOR relationships is derived, each second set relationship containing at least n−1 data symbols from at least n−1 storage elements and one parity symbol from a second set of parity symbols. Additional sets of relationships are derived such that a total of m sets of relationships are derived. Each of the additional sets of relationships are composed of up to $^{(n+i-1)}C_{i-1}$ relationships, where i indicates the numbered set of relationship. Using the first, second and additional sets of derived relationships, scripts are generated to resolve unresolved symbols resulting from possible m-storage element failure combinations.

10 Claims, 4 Drawing Sheets

METHOD AND SYSTEM FOR RECOVERING FROM MULTIPLE DRIVE FAILURES

CROSS-REFERENCE TO RELATED APPLICATIONS

This patent application claims priority to U.S. Provisional Application No. 60/624,564 filed on Nov. 4, 2004 in the U.S. Patent and Trademark Office, the entire content of which is incorporated by reference herein.

FIELD OF THE INVENTION

The present invention relates to a networked storage system. In particular, this invention relates to a method that allows for data regeneration and check data computation in a networked storage system and, specifically, relates to an algorithm that compensates for multiple drive failures in a networked storage system.

BACKGROUND OF THE INVENTION

With the accelerating growth of Internet and intranet communication, high-bandwidth applications (such as streaming video), and large information databases, the need for networked storage systems has increased dramatically. System performance, data protection, and cost have been some of the main concerns in designing networked storage systems. In the past, many systems have used fibre channel drives, because of their speed and reliability. However, fibre channel drives are very costly. Integrated drive electronics (IDE) drives are much cheaper in terms of dollars-per-gigabyte of storage; however, their reliability is inferior to that of fibre channel drives. Furthermore, IDE drives require cumbersome 40-pin cable connections and are not easily replaceable when a drive fails. Serial advanced technology attachment (SATA) drives that use the same receptor as their fibre channel counterparts are now available. These drives, therefore, have the speed required for acceptable system performance and are hot-swappable, which means that failed SATA drives are easily replaced with new ones. Furthermore, they provide more storage than do fibre channel drives and at a much lower cost. However, SATA drives still do not offer the same reliability as fibre channel drives. Thus, there is an industry push to develop high-capacity storage devices that are low cost and extremely reliable.

To improve data reliability, many computer systems implement a redundant array of independent disks (RAID) system, which is a disk system that includes a collection of multiple disk drives that are organized into a disk array and managed by a common array controller. The array controller presents the array to the user as one or more virtual disks. Disk arrays are the framework to which RAID functionality is added, in functional levels, in order to produce cost-effective, highly available, high-performance disk systems.

In RAID systems, the host data and check data (computed based on host data) are distributed over multiple disk drives in order to allow parallel operation and thereby enhance disk access performance and provide fault tolerance against drive failures. Currently, a variety of RAID levels from RAID level 0 through RAID level 6 have been specified in the industry. RAID level 5 provides a single-drive fault tolerance. That is, this RAID level allows reconstruction of the original data, if any one of the disk drives fails. It is possible, however, that more than one SATA drive may fail in a RAID system. Current RAID 5 failure algorithms are not sufficient to recover all data from a RAID system failure that involves more than one drive.

To provide, in part, a dual-fault tolerance to such failures, the industry has specified a RAID level 6. The RAID 6 architecture is similar to RAID 5, but RAID 6 can overcome the failure of any two disk drives by using an additional parity block (for a storage loss of 2/N, where N is the number of disk drives). The first parity block (P) is calculated by the user's performing an exclusive or (XOR) operation on a set of positionally assigned data sectors (i.e., rows of data sectors). Likewise, the second parity block (Q) is generated by the use of the XOR function on a set of positionally assigned data sectors (i.e., columns of data sectors). When a pair of disk drives fails, the conventional dual-fault-tolerant RAID systems reconstruct the data of the failed drives by using the parity sets. These RAID systems are well known in the art and are amply described, for example, in *The RAIDbook, 6th Edition: A Storage System Technology Handbook*, edited by Paul Massiglia (1997), which is incorporated herein by reference.

An examplary multiple drive failure algorithm is found in U.S. Pat. No. 6,694,479, entitled, "Multiple drive failure recovery for a computer system having an array of storage drives." The '479 patent describes a method of and related system for generating error correction or parity information in a multiple disk computer system that supports multiple drive-fault tolerance. The method involves defining parity equations, to be based not only on data written to drives of the computer system, but also on other parity information, such that, in solving for missing data, specific equations need not be used. Defining parity equations in this manner, in combination with a coefficient matrix that defines the coefficients of the various parity equations, ensures the ability to solve for the missing data, even if some of the failed drives contain parity information.

The algorithm described in the '479 patent safeguards against the loss of data in the event of a multi-drive failure. However, the '479 patent method runs real-time, which limits processing bandwidth for other storage operations. Furthermore, the method described in the '479 patent does not exclusively use XOR operations on the data to regenerate data after a multiple drive failure. The recovery and encoding method described in the '479 patent requires extensive multiplication and division operations on the data. It is not solely parity based and, thus, requires additional hardware and processing cycles to recover and encode data. The method described in the '479 patent requires excessive processing to locate symbols required for regenerating data and further manipulating symbols to enable processing, because the parity symbol sizes are not equivalent to the size of the data symbols.

There is, therefore, a need for an effective means of calculating parity, such that the storage system is fault tolerant against any number of drive failures, provides optimal system performance by optimizing XOR bandwidth, and/or runs a priori, is capable of generating parity regardless of symbol position (i.e., is not dependent on row or diagonal/column parity), and requires only XOR operations in order to calculate parity or regenerate data.

It is therefore an object of the invention to provide an algorithm that compensates for multi-storage element failures in a networked storage system.

It is another object of this invention to provide an algorithm that compensates for multi-storage element failures in a networked storage system and that optimizes processing cycles by executing interpretive language scripts, generated offline, prior to system operation.

It is yet another object of this invention to provide an algorithm that compensates for multi-storage element failures in a networked storage system and that requires only XOR operations in order to regenerate data and calculate parity.

BRIEF SUMMARY OF THE INVENTION

A method of calculating parity for an m-storage element failure in a networked array of storage elements is presented. The method includes deriving a first set of n relationships where each of the first set of n relationships consists of an XOR statement equaling zero. Each of the first set of n relationships contains n data symbols from n storage elements and one parity symbol from a first set of parity symbols. The method also includes deriving a second set of n relationships where each of the second set of n relationships consists of an XOR statement equaling zero, containing at least n−1 data symbols from at least n−1 storage elements and one parity symbol from a second set of parity symbols. Additional sets of relationships are derived such that a total of m sets of relationships are derived. Each of the additional sets of relationships are composed of up to $^{(n+i-1)}C_{i-1}$ relationships, where i indicates the numbered set of relationship and C is a mathematical symbol for combination. Each of the sets of relationships consists of relationships that XOR to zero. Each relationship from each set contains at least n−(i−1) data symbols from at least n−(i−1) storage elements and one parity symbol from the $i^{th}$ set of parity symbols. Using the first, second and additional sets of derived relationships, scripts are generated to resolve unresolved symbols resulting from possible m-storage element failure combinations.

A system is also presented that calculates parity for an m-storage element failure in a networked array of storage elements, where m is greater than two. The system includes a set of n networked data storage elements, each of the n data storage elements partitioned into n partitions, each partition configured to store a symbol. The system also includes a first parity storage element partitioned into n partitions and networked with the set of n data storage elements, each partition configured to store a symbol. A second parity storage element is partitioned into n partitions and networked with the set of n data storage elements and the first parity storage element, each partition configured to store a symbol. Additional parity storage elements are partitioned into up to $^{(n+i-1)}C_{i-1}$ partitions, where i indicates the numbered parity storage element and C is a mathematical symbol for combination. Each of the additional parity storage elements are networked with the set of n data storage elements and the first and second parity storage elements, with each partition configured to store a symbol. The system further includes a storage controller that contains a parity generation and data regeneration module. The module is configured to access and run scripts to resolve unresolved symbols resulting from possible m-storage element failure combinations. The scripts use a first, a second and m−2 sets of relationships, wherein each of the first set of relationships consists of n data symbols from the n data storage elements and one parity symbol from the first parity storage element. Each of the first set of relationships consist of an XOR statement equaling zero. Each of the second set of relationships consists of at least n−1 data symbols from at least n−1 storage elements and one parity symbol from the second parity storage element. Each of the second set of relationships consists of an XOR statement equaling zero. Each of the m−2 sets of relationships consists of relationships that XOR to zero. Each relationship from each of the m−2 sets contains at least n−(i−1) data symbols from at least n−(i−1) storage elements and one parity symbol from the $i^{th}$ set of parity symbols.

These and other aspects of the invention will be more clearly recognized from the following detailed description of the invention which is provided in connection with the accompanying drawings.

DETAILED DESCRIPTION OF THE INVENTION

The present invention builds on U.S. application Ser. No. 11/196,409, filed Aug. 4, 2005, titled "Method and System for Calculating Single and Dual Parity for Networked Storage Elements," the disclosure of which is hereby incorporated by reference. U.S. application Ser. No. 11/196,409 describes a method of generating interpretive language scripts in which the sequence of XOR operations required to recover missing data is computed once, off-line, on a separate computer. The method of generating interpretive language scripts is further described in U.S. application Ser. No. 11/010,435, filed Dec. 20, 2004, hereby incorporated by reference.

The method described herein has the advantages offered by the method described in U.S. application Ser. No. 11/196,409; however, it offers the further advantage of recovering from multiple storage-element failures.

The present invention is a method of recovering from an m-storage-element failure in an n+m storage array, based on inputs from an n+(m−1) storage array algorithm. The following is an example method of solving for m-storage-element failures in an n+m array, where m=3, based on the n+2 algorithm described in U.S. application Ser. No. 11/196,409. Beginning with a three-storage-element-failure algorithm for n number of data storage elements, where n is any integer value, there are three storage elements that store parity data. Each of the n data storage elements has n number of symbols. A symbol may be an arbitrary number of bytes, a word, a portion of a sector, or a block of sectors. The storage elements dedicated to storing parity data are designated as P, Q and X storage elements. The P storage element includes n number of symbols, and the Q storage element includes n number of symbols, both of which are derived from the data symbols and method described in U.S. application Ser. No. 11/196,409. Specifically, the P and Q storage elements contain symbols that allow sets of symbols to XOR to logical '0.' Sets of symbols that XOR to logical '0' are called relationships.

The number of symbols in each relationship equation is equal to the number of data drives in the networked storage system plus one. The P relationships are a simple set of relationships between the symbols of storage elements and one symbol from the P parity storage element, where each relationship is $P_n$. Each $P_n$ includes one symbol from each data storage element and one symbol from the P storage element; each non-Q storage element symbol is in one, and only one, $P_n$.

The number of relationship equations is equal to the number of symbols in a column. No two relationships have a symbol in common, and each relationship has one symbol from each data storage element and one symbol from the P parity storage element. Thus, for any one missing non-Q symbol, there is a P relationship that can be used to resolve the missing symbol. The P relationship set is made up of the individual $P_n$ relationships.

The Q relationship set is derived by use of the following guidelines. The individual relationships within the Q relationship set are defined as $Q_n$. There are a total of n+1 individual Q relationships, although only n need be defined, since the additional relationship may be derived from the other defined n relationships. Each $Q_n$ includes a symbol from the Q parity storage element and one symbol from all the data storage elements and P parity storage element except one. Each storage element symbol is in one, and only one, $Q_n$. No two symbols in a $Q_n$ relationship are in a $P_n$ relationship. No two $Q_n$ relationships exclude the same storage element.

Because only n Q relationships need be defined (while the additional relationship may be derived), the Q storage element need only store n symbols—again, the additional symbol may be derived by performing an XOR operation on the other n Q symbols. This has the advantage of providing data efficiency equal to n/(n+2). During write operations, this embodiment provides better data efficiency, because there is no need to calculate the Q[n+1] symbol and, thus, the processing cycles required to calculate Q[n+1] are saved; however, there is processor overhead required to calculate the Q[n+1] symbol during degraded operations (e.g., one or two storage elements have failed and data from a failed drive has been requested).

For a three-storage-element failure, an additional parity storage element, X, is required for the algorithm, which includes not more than (n+1)*(n+2)/2 number of symbols. For example, in an 8+3 system, there are eight data storage elements plus a P storage element, a Q storage element, and an X storage element. In this example, there are also eight symbols per data storage element and the P and Q storage elements. There are up to (n+1)*(n+2)/2 symbols on the X storage element (to improve operations, unneeded symbols are not stored on the X storage element). For this example, there are up to forty-five symbols on the X storage element.

The following table, Table 1, illustrates an example of an 8+3 system that has eight data storage elements, each including eight symbols, P and Q storage elements that also include eight symbols, and an X storage element that includes not more than forty-five symbols (the algorithm determines the minimum number of X symbols required to recover from all three-storage-element-failure cases; thus, there may be less than forty-five symbols). The following table, Table 1, shows an example X relationship candidate set for the 8+3 example.

| | | | | | | X Relationships | | | | | |
|---|---|---|---|---|---|---|---|---|---|---|---|
| | D0 | D1 | D2 | D3 | D4 | D5 | D6 | D7 | P | Q | X |
| 0 | X20 | X20, X35 | X21, X33 | X21, X28 | X22, X28 | X22, X30 | X23 | | X23, X27, X30 | X3, X27 | X22 | X20 |
| 1 | X21 | X30 | X20 | X20, X31, X35 | X24 | X24 | X21, X22 | X22, X28 | X23, X28 | X23 | X21 |
| 2 | X22 | X22 | X23, X34 | X23 | X20, X21, X35 | X20, X29, X35 | X2, X29, X35 | X21, X26 | X26 | X32 | X22 |
| 3 | X24, X32 | X24, X34 | X3, X32 | X3, X29, X34 | X23, X29 | X23 | X31 | X25 | X20, X25, X31 | X20 | X23 |
| 4 | X26, X33 | X29 | X24, X29 | X24, X25 | X25, X30 | X31 | X24, X30 | X24, X31 | X21 | X2, X26, X33 | X24 |
| 5 | X28, X30 | X25 | X25 | X26 | X26, X33 | X27, X32 | X27, X33, X34 | X32 | X30 | X28, X34 | X25 |
| 6 | X27, X31, X35 | X28, X33 | X28, X31 | X33 | X34 | X25, X34 | X25, X32 | X34 | X35 | X27, X30 | X26 |
| 7 | X29 | X27, X32 | X27 | X32 | X31 | X26 | X26, X33 | X35 | X22, X33 | X29 | X27 X28 X29 X30 X31 X32 X33 X34 X35 . . . |

Table 1 Example X relationship candidate set, in which the X relationships produce the required XOR equations for a method of data recovery and regeneration for an 8+3 networked storage system. The entire X relationship set is not shown in Table 1.

The disclosed method of calculating the additional X parity for a networked storage system assumes that each block of data in a storage element (represented by a column in Table 1) is a group of n symbols. For this example, there are eight data storage elements and, thus, eight symbols per data storage element.

The X relationship set shown in Table 1 abides by the following algorithmic constraints:

1) There are up to $^{(n+2)}C_2$ X Relationships.

2) Each X relationship has n+1 symbols: one symbol from the X column and one symbol from each column from a set of n columns, chosen out of a set of n+2 columns and formed of n data columns, one P column, and one Q column.

3) No two X relationships miss the same two columns.

4) No more than two symbols in an X relationship are in the same P relationship.

For this example, no more than two data storage element symbols that reside in a P relationship will also reside in an X relationship. Only two non-X storage elements are missing from each X relationship, and each non-X storage element dual-combination is skipped only once. For example, only one X relationship will exclude D0 and D1. No other X relationship will exclude the same two storage elements (D0 and D1) in combination.

For ease of illustration and explanation of the method described herein, each symbol is denoted as $S_i$, where no two symbols have i in common. Similarly, each relationship (P, Q, X, . . . mth relationship) is identified as $R_i$, where no two relationships have the same i in common. For example $P_1$-$P_8$ relationships may be represented as $R_1$-$R_8$, and $Q_1$-$Q_9$ relationships may be represented as $R_9$-$R_{17}$, and the remaining X relationships start at $R_{18}$. The entire set of R relationships (that include P, Q, and X relationships) is defined as the global relationship set. Any numbering scheme may be used, so long as no two $R_i$ relationships have the same i values in common.

For m-storage-element failures, at least m*n symbols in Table 1 become unknown. For example, in a three-data-storage-element failure for an 8+3 system, twenty-four symbols become unknown. Thus, for any relationship, there are no more than three missing symbols. When a relationship has only one symbol unknown, it is called a surviving relationship. Relationships that have two or three unknown symbols are called non-surviving relationships. Any relationship that has no unknown symbols is called an intact relationship.

In operation, after a three-storage-element failure, the algorithm creates an initial missing symbol list that corresponds to the failed storage elements. Then, the algorithm assesses the state of all relationships in the global relationship set, according to a degradation ranking. The degradation rank is equal to the number of missing symbols in a relationship. For example:

$D_r$=0=>Intact $D_r$=1=>Survivor $D_r$=2=>Non-survivor—needs one symbol to be recovered in order to become a survivor $D_r$=3=>Non-survivor—needs two symbols to be recovered in order to become a survivor .$D_r$=m=>Non-survivor—needs m-1 symbols to be recovered in order to become a survivor All relationships in the global relationship set are assigned a degradation rank. For example, $R_{1r}$ denotes the degradation rank of relationship $R_1$. If there are two symbols missing from $R_1$ (e.g., $S_1$ and $S_4$), then $R_{ir}$=2, and the missing symbol set that corresponds to $R_1$ is denoted as $R_{1m}$={$S_1$, $S_4$}. $R_1$ needs one symbol recovered to become a survivor. The advantage of the missing symbol set is that the XOR of the missing symbols in the set is a known value, which is the XOR of the remaining terms of $R_1$.

The method computes the degradation rank and missing symbol set for each relationship. The list of all missing symbol sets comprises a basis.

Two missing symbol sets (e.g., $R_{im}$ and $R_{jm}$) form a parent set and reduction set pair, if the degradation rank of $R_{jm}$=d+1, the degradation rank of $R_{im}$=d, and there is only one symbol that is not common among them.

For example, the relationship $R_1$ has a missing symbol set $R_{1m}$={$S_3$, $S_5$}. $R_{1m}$ has two missing symbols: $S_3$ and $S_5$; thus, the degradation rank $R_{1r}$ is two ($R_{1r}$=2). Because the known terms of relationship $R_1$ XOR to equal $S_3\hat{}S_5$, then $S_3\hat{}S_5$ is known and can be denoted by a value A.

The relationship $R_2$ has a missing symbol set $R_{2m}$={$S_2$, $S_3$, $S_5$}. $R_{2r}$ has missing symbols: $S_2$, $S_3$, $S_5$; thus, the degradation rank $R_{2r}$ is three ($R_{2r}$=3). Because the known terms of relationship $R_2$ XOR to $S_2\hat{}S_3\hat{}S_5$, then $S_2\hat{}S_3\hat{}S_5$ is known and can be denoted by a value B.

Because $R_{1m}$ and $R_{2m}$ have only one symbol that is not common ($S_2$) and degradation ranks are two and three, respectively, $R_{1m}$ is the reduction set of $R_{2m}$ and $R_{2m}$ is the corresponding parent set. The uncommon symbol $S_2$ is resolved as $S_2$=A$\hat{}$B.

If a reduction set does not reside in the basis, a derived reduction set may be possible from the XOR of two or more missing symbol sets. Continuing from the previous example:

Relationship $R_3$ has three missing symbols {$S_5$, $S_6$, $S_7$} and, thus, a degradation rank $R_{3r}$=3.

The XOR of known symbols of relationship $R_3$ is known, $S_5\hat{}S_6\hat{}S_7$=C, where C equals the XOR of all of the remaining known symbols in $R_3$.

Relationship $R_4$ has two missing symbols {$S_3$, $S_6$} and, thus, a degradation rank $R_{4r}$=2.

The XOR of known terms of relationship $R_4$ is known, $S_3\hat{}S_6$=D, where D equals the XOR of all remaining known symbols in $R_4$.

The following is an example of a synthesized reduction set.

Given: $R_{1m}$={$S_3$,$S_5$} and $R_{4m}$={$S_3$,$S_6$}, $R_{1m}$+$R_{4m}$ results in the missing symbol set: $D_{1m}${$S_5$, $S_6$}, which has a degradation rank $D_{1r}$=2. "+" indicates a set operation between $R_{1m}$ and $R_{4m}$; henceforth, the + operation denotes the set operation, as defined: $R_{1m}$+$R_{4m}$=($R_{1m}$∪$R_{4m}$)−($R_{1m}$∩$R_{4m}$). The XOR of the known terms of $R_1$ is defined as the residue of $R_{1m}$, which is equal to $R_{1m}$ (in this example, denoted by value A, which is known), and the XOR of the known terms of $R_4$ is defined as the residue of $R_{4m}$, which is equal to $R_{4m}$ (in this example, denoted by value D, which is known). Hence, the residue of $D_{1m}$=$D_{1m}$=the residue of ($R_{1m}$+$R_{4m}$)=($R_{1m}\hat{}R_{4m}$)=A$\hat{}$D.

Because $R_{3m}$ and $D_{1m}$ have only one symbol that is not common ($S_7$), and the degradation ranks of $R_{3m}$ and $D_{1m}$ differ by one, $D_{1m}$ is the reduction set of $R_{3m}$ and $R_{3m}$ is the corresponding parent set. The residue of $R_{3m}$=$R_{3m}$=C and the residue of $D_{1m}$=$D_{1m}$=A$\hat{}$D. Therefore, the uncommon symbol $S_7$ is resolved as the residue of ($D_{1m}$+$R_{3m}$)=($D_{1m}\hat{}R_{3m}$), which is $S_7$=A$\hat{}$D$\hat{}$C. Thus, the missing symbol can be resolved as the XOR of the residues of the parent set and its corresponding reduction set. The reduction set may exist in the basis or be synthesized. The synthesis method is as described in more detail in reference to method 400 of FIG. 4.

The method of resolving all missing symbols that correspond to a basis is further described in the following sections. The methods described below use a three-storage-element-failure combination example; however, one skilled in the art will recognize that these methods are extended, to prevent data loss that results from any m-storage-element-failure combination.

Figure 1:
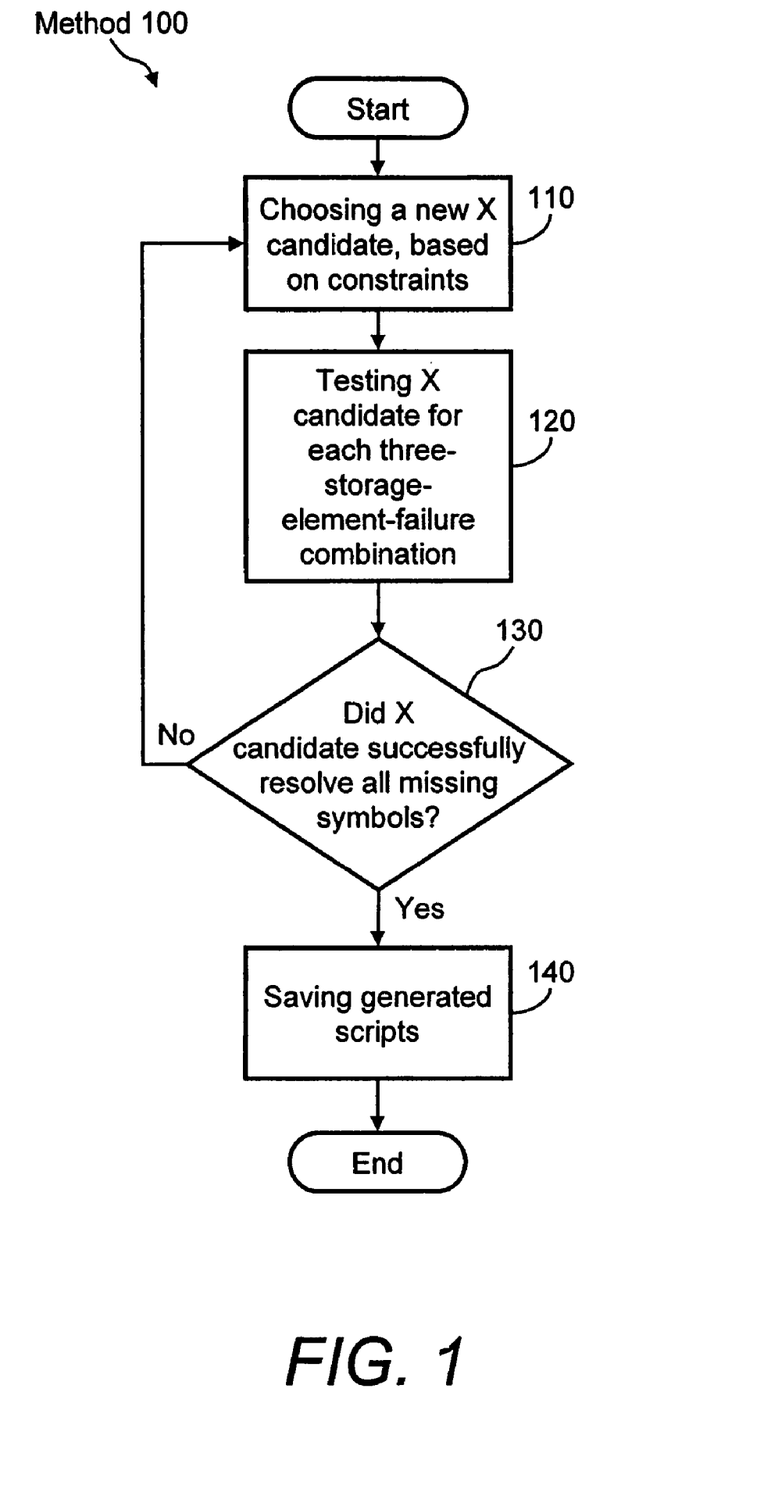
FIG. 1 is a flow diagram that illustrates a method of identifying a successful X candidate for recovery of all missing symbols from all three-storage-element-failure combinations in accordance with an exemplary embodiment of the invention.

FIG. 1 is a flow diagram that illustrates a method 100 of identifying a successful X candidate for recovery of all missing symbols from all three-storage-element-failure combinations.

Step 110: Choosing a New X Candidate, Based on Constraints

In this step, method 100 chooses a new random X candidate, which obeys the constraints described in the previous section. Method 100 proceeds to step 120.

Step 120: Testing X Candidate for each Three-storage-element-failure Combination In this step, method 100 tests whether the chosen X candidate successfully recovers all missing symbols, regardless of the combination of three-storage-element failures. This step is described in more detail in reference to FIG. 2. Method 100 proceeds to step 130.

Step 130: Did X Candidate Successfully Resolve all Missing Symbols?

In this decision step, method 100 evaluates the test results of the X candidate. If the X candidate is successful, method 100 proceeds to step 140. If the X candidate is unsuccessful, method 100 returns to step 110.

Step 140: Saving Generated Scripts

In this step, the X candidate set passes the test of successfully resolving all missing symbols (thus, all relationships are finally intact) for all m-storage-element-failure combinations (in this example, m=3). The XOR expressions that correspond to the resolution of each missing symbol are written to a file as a script. The ability to resolve all missing symbols for all failure cases proves that the X relationship set ensures that no data is lost. Method 100 ends.

Additionally, method 100 is processed off-line, on a separate computer system from the networked storage system. The result is an optimized set of interpretive language scripts that are uploaded to the networked storage controllers during initialization. The scripts run real-time, in the event of multiple storage-element failures, to recover missing data and to calculate write parity during write operations. The interpretive language scripts are described in detail in U.S. application Ser. No. 11/010,435.

Figure 2:
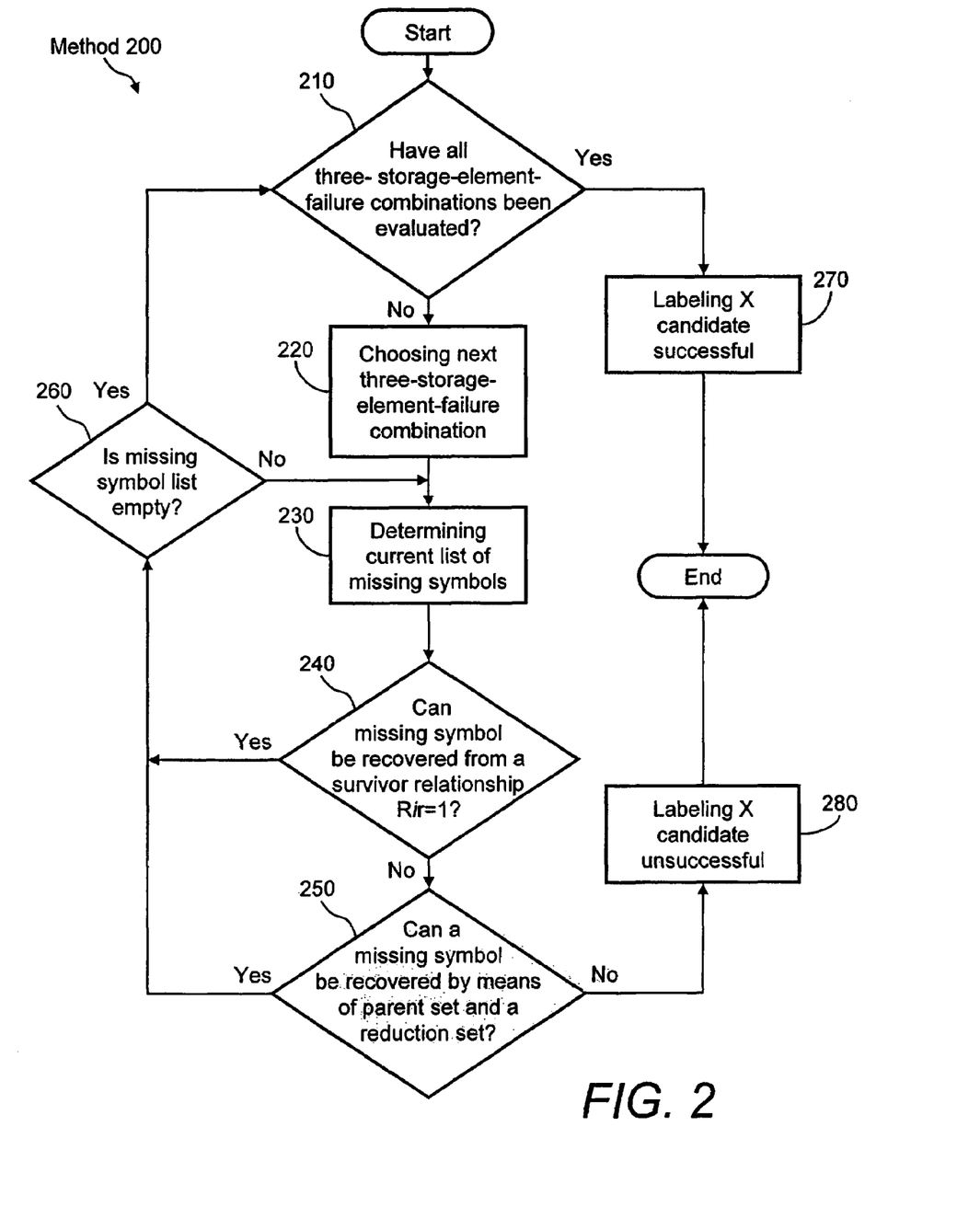
FIG. 2 is a flow diagram of a method of resolving missing symbols, by using the basis, in accordance with an exemplary embodiment of the invention.

FIG. 2 is a flow diagram of a method 200 of resolving missing symbols, by using the basis.

Step 210: Have All Three-storage-element Failures Been Evaluated?

In this decision step, method 200 determines whether every combination of three-storage-element failures has been evaluated for the X candidate's ability to resolve all missing symbols. If yes, method 200 proceeds to step 270; if no, method 200 proceeds to step 220.

Step 220: Choosing Next Three-storage-element-failure Combination

In this step, method 200 chooses another three-storage-element-failure case that has not been evaluated previously. For example, if the combination failure of $D_0$, $D_1$, and $D_2$ was used to test the X relationship candidate set, and it was a successful test, then the X relationship set candidate is tested with another combination, for example, $D_1$, $D_2$, and $D_3$ failures, which has not been previously tested. Method 200 proceeds to step 230.

Step 230: Determining Current List of Missing Symbols

In this step, method 200 develops a missing symbol, list based on the symbols no longer available after a three-storage-element failure, and those symbols that have been resolved are removed from the list. From this list, method 200 computes a degradation rank, $R_{ir}$, and missing symbol set, $R_{im}$, for each relationship in the global relationship set, based on the current missing symbol list. Method 200 proceeds to step 240.

Step 240: Can a Missing Symbol be Recovered from a Survivor Relationship $R_{ir}=1$?

In this decision step, method 200 determines whether the degradation rank of a relationship $R_{ir}$ is equal to the value one. If yes, method 200 resolves the missing symbol, by expressing it as the XOR of the remaining symbols in the relationship, and method 200 proceeds to step 260; if no, method 200 proceeds to step 250.

Step 250: Can a Missing Symbol be Resolved by Means of a Parent Set and a Reduction Set?

In this decision step, method 200 attempts to derive a parent set and a reduction set pair from the basis, which can be used to recover a missing symbol from the missing symbol list. This method step is described in more detail in reference to method 300 of FIG. 3. If method 300 successfully resolves a missing symbol, method 200 proceeds to step 260; if no, method 200 proceeds to step 280.

Step 260: Is Missing Symbol List Empty?

In this decision step, method 200 removes the recovered symbol from the missing symbol list and determines whether the missing symbol list is empty. If yes, method 200 returns to step 210; if no, method 200 returns to step 230.

Step 270: Labeling X Candidate Successful

In this step, method 200 labels the corresponding X relationship set candidate as a successful relationship set that resolves all missing symbols, in any combination, of three-storage-element failures. Method 200 ends.

Step 280: Labeling X Candidate Unsuccessful

In this step, method 200 labels the corresponding X relationship set candidate as an unsuccessful relationship set. Method 200 ends.

Figure 3:
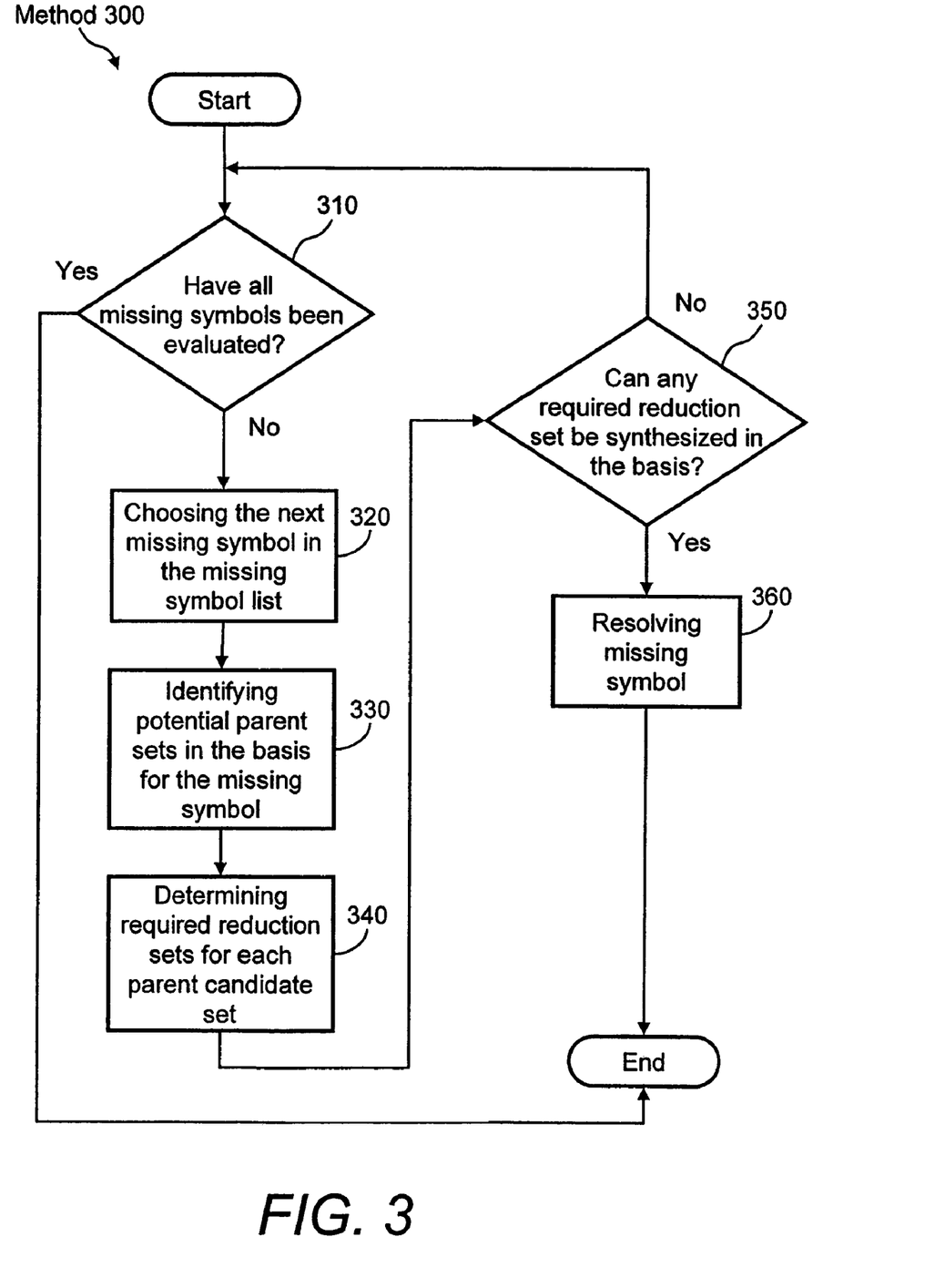
FIG. 3 is a flow diagram of a method of deriving reduction sets in accordance with an exemplary embodiment of the invention.

FIG. 3 is a flow diagram of a method 300 of deriving reduction sets.

Step 310: Have All Missing Symbols Been Evaluated?

In this decision step, method 300 evaluates whether all missing symbols have been evaluated for recoverability. If yes, method 300 returns failure and ends; if no, method 300 proceeds to step 320.

Step 320: Choosing the Next Missing Symbol in the Missing Symbol List

In this step, method 300 chooses the next symbol in the missing symbol list, $S_i$, for evaluation of recoverability. Method 300 proceeds to step 330.

Step 330: Identifying Potential Parent Sets in the Basis for the Missing Symbol

In this step, method 300 creates a list of missing symbol sets that include the missing symbol $S_i$ (chosen is step 320) to be resolved during this iteration of the algorithm. The missing symbol sets that include $S_i$ are called the parent candidates set, $P_i$. Method 300 proceeds to step 340.

Step 340: Determining Required Reduction Sets for Each Parent Candidate Set

In this step, method 300 calculates the required reduction set, $D_{im}$, needed to resolve the missing symbol $S_i$ from each of the parent set candidates, $P_i$. For example, to resolve the missing symbol $S_2$ from a parent candidate $R_{1m}=\{S_1, S_0, S_2\}$, the required reduction set is $D_{1m}=\{S_1, S_0\}$. Method 300 proceeds to step 350.

Step 350: Can Any Required Reduction Set be Synthesized in the Basis?

In this decision step, method 300 sets iteration count equal 0 and calls method 400 (described in more detail in reference to FIG. 4) for every required reduction set, $D_{im}$, until method 400 returns with a success (i.e., a reduction was successfully synthesized) or method 400 returns failure status for all required reduction sets. If method 400 returns a failure in attempting to synthesize for each of the required reduction sets, method 300 returns to step 310; if not (i.e., method 400 was successful in synthesizing one of the required reduction sets), method 300 proceeds to step 360.

Step 360: Resolving Missing Symbol

In this step, method 300 resolves the desired missing symbol, $S_i$, from the successfully synthesized required reduction set and its corresponding parent set. Method 300 returns a status of success and ends.

Figure 4:
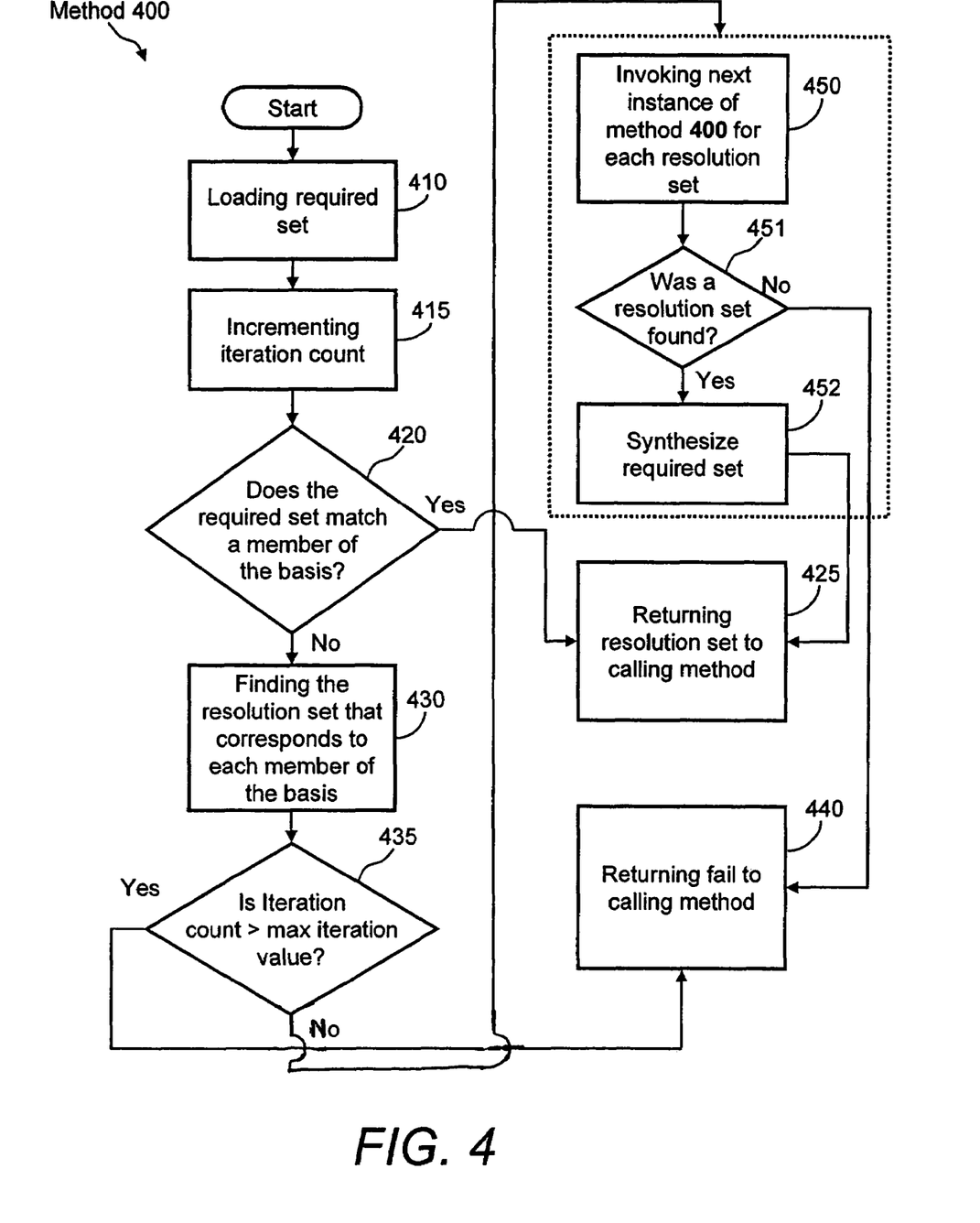
FIG. 4 is a flow diagram of a method of a recursive algorithm that attempts to synthesize a required set from the current basis in accordance with an exemplary embodiment of the invention.

FIG. 4 is a flow diagram of a method 400 of a recursive algorithm that attempts to synthesize a required set from the current basis (note: FIG. 4 shows only one recursion of method 400 for a basis that includes only one member).

Step 410: Loading Required Set

In this step, method 400 loads the required set, $D_{im}$, specified by step 350 of method 300 or from the previous call to method 400. Method 400 proceeds to step 415.

Step 415: Incrementing Iteration Count

In this step, method 400 increases the iteration count. Method 400 proceeds to step 420.

Step 420: Does the Required Set Match a Member of the Basis?

In this decision step, method 400 determines whether the required set, $D_{im}$, from step 410 matches any of the missing symbol sets, $R_{im}$, of the current basis. If yes, method 400 proceeds to step 425; if no, method 400 proceeds to step 430.

Step 425: Returning Resolution Set

In this step, method 400 returns the matching missing symbol set, $R_{im}$, from step 420 to method 300 or an earlier instance of method 400. Method 400 returns the status as success to the calling method.

Step 430: Finding the Resolution Set that Corresponds to Each Member of the Basis In this step, method 400 calculates the resolution set, $R'_{im}$, for each missing symbol set, $R_{im}$, of the current basis. The resolution sets, $R'_{im}$, are the theoretical missing symbol sets that, when added to the existing missing symbol sets, $R_{im}$, in the current basis, become the required set, $D_{im}$. For example, to obtain a required set $D_{1m}=\{S_0, S_1, S_2, S_3\}$ with a missing symbol set $R_{1m}=\{S_0, S_1\}$ requires the addition of the set $R'_{1m}=\{S_2, S_3\}$, because $R_{1m}+R'_{1m}=D_{1m}$ (i.e. $\{S_0, S_1\}+\{S_2, S_3\}=\{S_0, S_1, S_2, S_3\}$). Method 400 proceeds to step 435.

Step 435: Is Iteration Count>Max Iteration Value?

In this step, method 400 compares the current iteration count with the max iteration value (for example, max iteration value is equal to the number of members in the basis). Method 400 determines whether the iteration count>max iteration value; if yes, method 400 proceeds to step 440; if no, method 400 proceeds to step 450.

Step 440: Returning Fail

In this step, method 400 has failed to synthesize the required set $D_{im}$ that was established in step 410. Method 400 sends failure status to the calling method (method 300 or an earlier instance of method 400).

Step 450: Invoking Next Instance of Method 400 for Each Resolution Set

In this step, method 400 invokes another instance of method 400 with the input required set as the current resolution set, along with current basis. Method 400 proceeds to step 452.

Step 452: Was a Resolution Set Found?

In this decision step, if the called method 400 returns with success, the current method 400 proceeds to step 453; else current method exits to step 440.

Step 453: Synthesizing Required Set

In this step, the current method 400 synthesizes the required set as the returned resolution set and the corresponding missing symbol set (determined in step 430 of the current instance of method 400). Method 400 returns to step 425.

Method 400 proceeds to step 440 (no resolution set could be synthesized).

The symbols in the X column of Table 1 that correspond to relationships that were not used by methods 300 or 400 need not be saved and, therefore, fewer X symbols are required, which results in better data efficiency.

An example of recursive method 400 for synthesizing reduction sets in two recursions is outlined below:

Given current basis:

$R_{1m}$: $S_0 \hat{} S_1 = A$ (A is a constant, which is the XOR of other known terms of Relationship $R_1$)

$R_{2m}$: $S_2 \hat{} S_3 = B$ (B is a constant, which is the XOR of other known terms of Relationship $R_2$)

Given required set:

Required set=$D_{1m}=\{S_0, S_1, S_2, S_3\}$

Start:

Method 300 step 350 calls method 400 and provides the required set as input.

$1^{st}$ instance of method 400 step 410: Basis has two members: $R_{1m}=\{S_0, S_1\}$, $R_{2m}=\{S_2, S_3\}$.

$1^{st}$ instance of method 400 step 415: iteration count=1.

$1^{st}$ instance step 420: the required set $D_{1m}$ is not a member of the current basis; proceed to $1^{st}$ instance of step 430.

$1^{st}$ instance of step 430: method 400 calculates the resolution sets that correspond to each member of the current basis. The resolution set is the set of symbols that, when added to the member set, results in the required set. The resolution set that corresponds to $R_{1m}$ is $R'_{1m}=\{S_2, S_3\}$ and for $R_{2m}$ is $R'_{2m}=\{S_0, S_1\}$, because $R_{1m}+R'_{1m}=D_{1m}$ and $R_{2m}+R'_{2m}=D_{1m}$.

$1^{st}$ instance of step 435: iteration count=1<max iteration value=2: go to step 450.

$1^{st}$ instance of step 450: invoke $2^{nd}$ instance of method 400, with required set as resolution set corresponding to $R'_{1m}$: $\{S_2, S_3\}$.

$2^{nd}$ instance step 410: $D'_{1m}=R'_{1m}$.

$2^{nd}$ instance step 415: iteration count=2.

$2^{nd}$ instance step $R'_{1m}$: method 400 identifies $R_{2m}$ as a member of the basis that equals the resolution $R'_{1m}$ and returns the resolution set and success status to $1^{st}$ instance of step 450.

$1^{st}$ instance of step 450: method 400 synthesizes the required set by adding $R_{1m}$ and $R_{2m}$ (i.e. $R_{1m} \hat{} R_{2m}$), where $R_{2m}$ equals the resolution set returned by the $2^{nd}$ instance of method 400, and returns a success status to method 300.

Based on the methods described herein that uses a three-storage-element failure example, one may solve for a four-storage-element failure combination, by building on the P, Q, and X relationship sets. For example, the method for generating scripts to recover from a four-storage-element failure combination tests a Y candidate, which follows the constraints as described below (where m=4):

The $m^{th}$ relationship set abides by the following algorithmic constraints:

There are up to $^{(n+m-1)}C_{m-1}$ number of relationships in the $m^{th}$ parity drive.

1. Each relationship in the $m^{th}$ relationship set has n+1 symbols: one symbol from the $m^{th}$ column and one symbol from each column from a set of n columns chosen out of a set of n+(m−1) columns that are formed of n data columns and m−1 parity columns (which do not include the $m^{th}$ column).

2. No two relationships in the $m^{th}$ relationship set miss the same columns (each relationship misses m−1 columns).

3. No more than m−1 symbols are in the same P or Q relationship.

Similarly, a five-storage-element failure combination tests a Z candidate (which follows the constraints listed above), by building on the P, Q, X, and Y relationship sets, and so on, for any number of m-storage-element failures in a networked storage system.

What is claimed as new and desired to be protected by Letters Patent of the United States is:

1. A method of recovering n×m unresolved symbols from a possible m-storage element failure in a networked array of n data storage elements and m parity storage elements, where m is greater than two and n is greater than or equal to m, each storage element having n symbols, the method comprising:

deriving a first set of n relationships, each of the first set of n relationships consisting of n data symbols from the n data storage elements and one parity symbol from a first set of parity symbols, the n data symbols and one parity symbol in each relationship being individually subjected to XOR operations that collectively equal zero;

deriving a second set of n relationships, each of the second set of n relationships consisting of n symbols from the n data storage elements and first set of parity symbols and one parity symbol from a second set of parity symbols, the n symbols and one parity symbol from the second set of parity symbols in each relationship being individually subjected to XOR operations that collectively equal zero;

deriving additional sets of relationships such that a total of m sets of relationships are derived, each of the additional sets of relationships composed of up to $^{(n+i-1)}C_{i-1}$ relationships, where i indicates the numbered set of relationship and C is the mathematical symbol for combination, meaning the number of combinations of (n+i−1) symbols taken i−1 at a time, each relationship in the sets of relationships consisting of n symbols from the n data storage elements and i−1 sets of parity symbols and one parity symbol from the $i^{th}$ set of parity symbols, the at least n symbols and one parity symbol from the $i^{th}$ set of parity symbols in each relationship being individually subjected to XOR operations that collectively equal zero;

generating scripts that use the first, second and additional sets of relationships to generate XOR equations to resolve the unresolved n×m symbols resulting from possible m-storage element failure combinations, uploading the scripts to one or more storage element controllers for the networked array; and running the scripts to resolve the unresolved n×m symbols resulting from an m storage element failure combination.

2. The method of claim 1, wherein deriving a first set of n relationships results in each symbol from the n data storage elements and the first set of parity symbols being contained by no more than one relationship in the first set of relationships.

3. The method of claim 1, wherein deriving a second set of n relationships results in each symbol from the n storage elements and the sets of first and second parity symbols being contained by no more than one relationship in the second set of relationships.

4. The method of claim 1, wherein the steps of deriving a first set and a second set of n relationships results in no relationship of the second set of relationships having a same combination of data symbols as in any relationship of the first set of relationships.

5. The method of claim 1, wherein deriving a second set of n relationships results in no two relationships in the second set of relationships excluding the same storage element.

6. The method of claim 1, wherein deriving additional sets of relationships results in no two relationships in the $i^{th}$ set of relationships excluding the same i−1 storage elements.

7. The method of claim 1, wherein the steps of deriving a first set, a second set, and additional sets of relationships results in no relationship of the $i^{th}$ set of relationships having a same combination of data symbols as in any relationship of the first or second sets of relationships.

8. The method of claim 1, wherein the steps of deriving a first set, a second set, and additional sets of relationships uses symbols that are one of the group consisting of an arbitrary number of bytes, a word, a portion of a sector, and a block of sectors.

9. The method of claim 1, wherein generating scripts further comprises evaluating m-storage element failure combinations;

identifying intact, surviving and non-surviving relationships that correspond to the evaluated failure combinations; and resolving unresolved symbols using the intact, surviving and non-surviving relationships.

10. The method of claim 1, wherein the step of generating scripts occurs off line in advance of an m-storage element failure in the networked array of storage elements.

* * * * *